（12）United States Patent
Adamczyk et al.

(10) Patent No.: US 6,379,250 B2
(45) Date of Patent: *Apr. 30, 2002

(54) SIMULATED BALL MOVEMENT GAME USING A TRACKBALL WITH AN AIR BEARING

(75) Inventors: J. Walt Adamczyk, Pasadena; Donald L. Updyke, Jr., Palmdale; William George Adamson, Glendale, all of CA (US)

(73) Assignee: Hyper Management, Inc., Burbank, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,541

(22) Filed: Dec. 28, 1998

(51) Int. Cl.[7] .................................................. A63F 13/00
(52) U.S. Cl. ................................. 463/37; 463/1; 463/2
(58) Field of Search ............................ 463/1, 2, 31, 36, 463/37; 345/167, 161

(56) References Cited

U.S. PATENT DOCUMENTS

| 460,592 A | | 10/1891 | McConaughy | |
|---|---|---|---|---|
| 460,593 A | | 10/1891 | McConaughy | |
| 3,308,848 A | * | 3/1967 | Johnson | 384/109 |
| 3,583,777 A | * | 6/1971 | Yang | 308/170 |
| 3,625,083 A | | 12/1971 | Bose | |
| 3,782,791 A | * | 1/1974 | Neumann et al. | 137/812 |
| 3,886,803 A | * | 6/1975 | Jacobson et al. | 310/216 |
| 3,892,963 A | | 7/1975 | Hawley et al. | 250/231 |
| 3,931,974 A | | 1/1976 | Goldfarb et al. | 273/126 |
| 4,303,914 A | | 12/1981 | Page | 340/706 |
| 4,401,300 A | * | 8/1983 | Morin | 198/644 |
| 4,410,220 A | * | 10/1983 | Robinson | 384/109 |
| 4,464,652 A | | 8/1984 | Lapson et al. | 340/710 |
| 4,595,070 A | | 6/1986 | Hodges | 180/125 |
| 4,606,587 A | * | 8/1986 | Thompsom | 384/12 |
| 4,838,550 A | | 6/1989 | Walker | 273/86 |
| 4,850,591 A | | 7/1989 | Takezawa et al. | 273/85 |
| 5,078,019 A | | 1/1992 | Aoki | 74/471 |
| 5,162,780 A | | 11/1992 | Solhjell | 340/710 |
| 5,171,978 A | | 12/1992 | Mimlitch et al. | 250/221 |
| 5,175,534 A | * | 12/1992 | Thatcher | 340/706 |
| 5,237,311 A | | 8/1993 | Mailey et al. | 340/710 |
| 5,287,090 A | | 2/1994 | Grant | 345/163 |

(List continued on next page.)

FOREIGN PATENT DOCUMENTS

| DE | 1211408 | 2/1966 |
|---|---|---|
| DE | 3407131 | 2/1984 |
| JP | 60-134331 | 12/1983 |
| JP | 60-207921 | 10/1985 |

*Primary Examiner*—Jessica J. Harrison
*Assistant Examiner*—John M Hotaling, II
(74) *Attorney, Agent, or Firm*—Crosby Heafey Roach & May LLP

(57) ABSTRACT

In a system and method for simulating a ball movement game, the system includes an input ball adapted to enable movement of a simulated ball in a graphical representation of the simulated game, responsive to movement of the input ball imparted by the player. The system further includes an air bearing for supporting the input ball so as to enable the player to directly impart movement to the input ball. The system also includes an optical encoder for generating the parameters of movement of the simulated ball responsive to detecting the parameters of movement of the input ball imparted by the player. The system still further includes a processor and software adapted to simulate a ball and movement of the simulated ball, responsive to the parameters of movement of the input ball detected by the optical encoder, and to simulate a game environment for movement of the simulated ball therein.

35 Claims, 6 Drawing Sheets

U.S. PATENT DOCUMENTS

| | | | |
|---|---|---|---|
| 5,377,997 A | 1/1995 | Wilden et al. | 273/434 |
| 5,386,089 A | 1/1995 | Tooi | 178/18 |
| 5,394,169 A | 2/1995 | Tseng | 345/167 |
| 5,405,152 A | 4/1995 | Katanics et al. | 273/438 |
| 5,409,226 A | 4/1995 | Mesko et al. | 273/148 |
| 5,423,556 A | 6/1995 | Latypov | 273/434 |
| 5,456,607 A | 10/1995 | Antoniak | 434/323 |
| 5,463,409 A | 10/1995 | Gilbert | 345/167 |
| 5,486,845 A | 1/1996 | Chait | 345/163 |
| 5,530,455 A * | 6/1996 | Gillick | 345/163 |
| 5,541,621 A | 7/1996 | Nmngani | 345/167 |
| 5,734,374 A * | 3/1998 | Chambers | 345/167 |
| 5,784,052 A * | 7/1998 | Keyson | 345/167 |
| 5,854,482 A * | 12/1998 | Bidiville et al. | 250/221 |
| 5,854,623 A * | 12/1998 | Bullister | 345/167 |
| 5,926,167 A * | 7/1999 | Niitsuma | 345/156 |
| 6,028,593 A * | 2/2000 | Rosenburg et al. | 345/156 |
| 6,222,525 B1 * | 4/2001 | Armstrong | 345/161 |

* cited by examiner

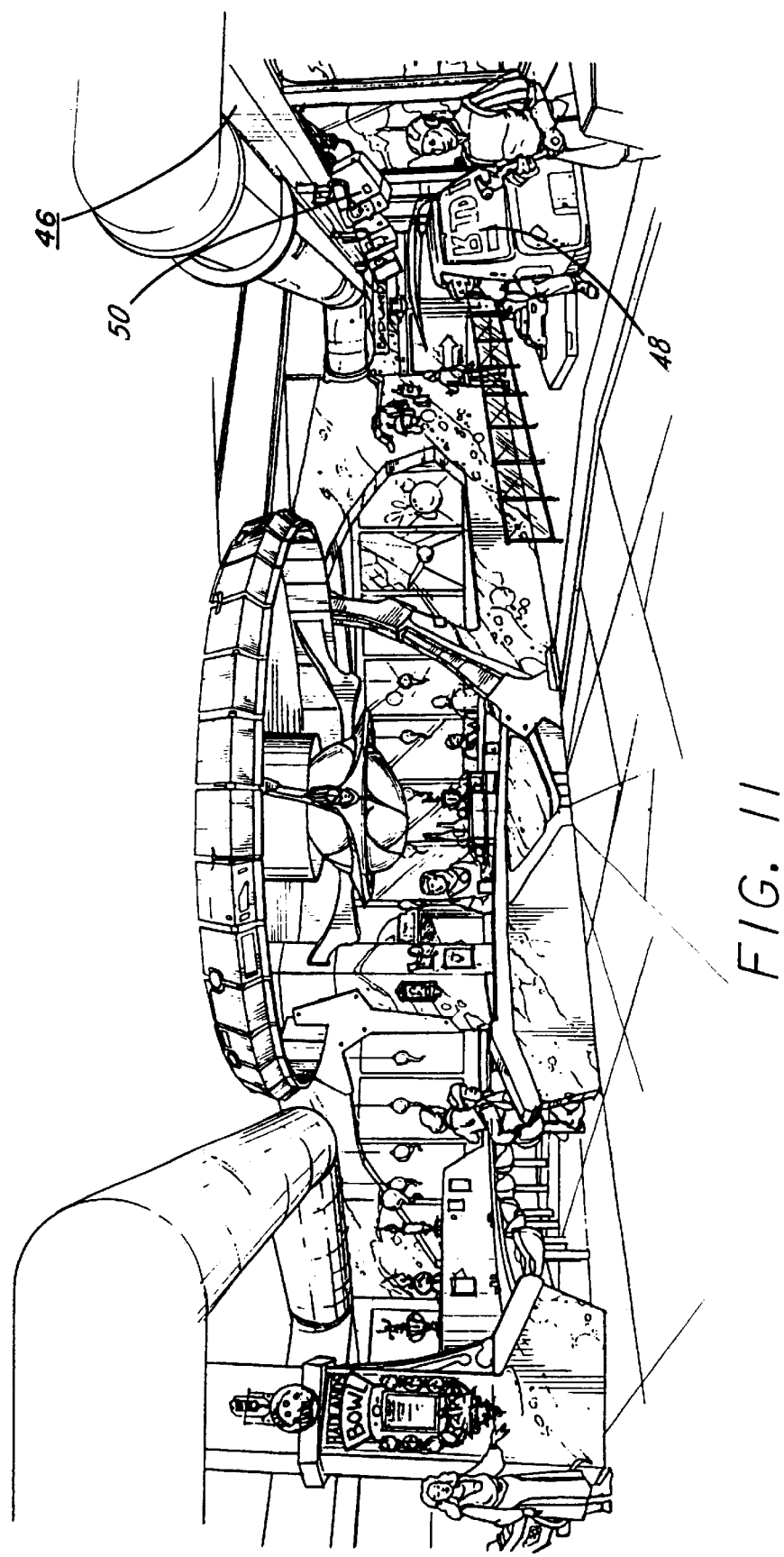

SIMULATED BALL MOVEMENT GAME USING A TRACKBALL WITH AN AIR BEARING

BACKGROUND OF THE INVENTION

1. Field of the Invention

This invention relates generally to improvements in simulated ball movement games, and, more particularly, to a new and improved system and method for realistically simulating the movement of a ball responsive to movement of an input ball imparted by a player in a virtual reality simulated ball movement game environment.

A portion of the disclosure of this patent document contains material which is subject to copyright protection. The copyright owner has no objection to the facsimile reproduction by anyone of the patent document or the patent disclosure, as it appears in the Patent and Trademark Office patent file or record, but otherwise reserves all copyright rights whatsoever.

2. Description of the Related Art

It has been known to provide a simulated ball movement kiosk-type game system wherein detection of movement by the player of a ball in a support member generates movement of a simulated ball on a screen. However, detection of movement of the ball in the support member in such a game system has been limited to detecting rolling movement of the ball by the player, with other parameters of movement of the simulated ball responsive thereto being preset in the game. The other parameters of movement of the simulated ball, including the speed, direction, and spin of the simulated ball, are not detected in such a game system. Furthermore, such a game system has limited flexibility, in that the parameters of the simulated game are not able to be changed by the player as desired for further enjoyment of the game, or for playing other games in different game environments.

Therefore, those concerned with the development and use of improved simulated ball movement games and the like have recognized the need for improved systems and methods for detecting the range of movement of a ball imparted by a player so as to generate realistic simulated ball movement, in a player-definable game environment. Accordingly, the present invention fulfills these needs by providing efficient and effective realistic simulation of ball movement, directly responsive to control of an input ball by the player, in a virtual reality environment, adapted to be defined by the user.

SUMMARY OF THE INVENTION

Briefly, and in general terms, the present invention provides a new and improved system and method for generating realistic simulated ball movement in a game, by direct control by the player of an input ball, and enables the player to define the parameters of the game environment.

By way of example, and not by way of limitation, the present invention provides a new and improved system for simulating a ball movement game, adapted to enable movement of a simulated ball responsive to movement of an input ball imparted by a player. The system includes an input ball, adapted to enable movement to be imparted thereto by a player. It further includes elements for supporting the input ball so as to enable the player to impart movement to the input ball. It also includes elements for generating the parameters of movement of the simulated ball, responsive to detecting the parameters of movement of the input ball imparted by the player. The system still further includes elements for generating a simulation of a ball movement game, adapted to simulate a ball and movement of the simulated ball, responsive to the parameters of movement of the input ball detected by the parameters generating means.

More particularly, the present invention includes an input track ball device, wherein the input ball is suspended on an air bearing, to enable free movement of the input ball therein. The air bearing track ball comprises an improved user input device which enables realistic simulated movement of a ball in a game such as a bowling game.

The system, in accordance with the present invention, also includes optical encoders for detecting movement of the input ball in a plurality of planes. This enables the system to detect the range of movement of the input ball imparted by the player for realistically generating movement of the simulated ball in the game responsive thereto.

The system also includes a processor and a program for processing in the processor which are adapted to provide a realistic simulated virtual reality game graphical representation wherein the dynamics and environment of the game may be varied by the player. This provides flexibility in enabling the player to change the parameters of the game as desired for enhanced player enjoyment, and enables the player to play other games and to play in a variety of different game environments.

Therefore, one advantage of the present invention is that it includes a track input ball suspended on an air bearing, to enable free movement thereof for generating realistic movement of a simulated ball in the game simulation.

Another advantage is that the present invention includes optical decoders for detecting input ball movement in a plurality planes, for generating the realistic simulated ball movement in a plurality of dimensions.

A further advantage is that it includes a processor and a program adapted to be processed in the processor for generating a graphical representation of a simulated virtual reality game environment, in which the player may change the game dynamics and environment, and may also change the game parameters. This enables the player to play other games, and to play a game in different game environments.

These and other objects and advantages of the invention will become apparent from the following more detailed description, when taken in conjunction with the accompanying drawings of illustrative embodiments.

BRIEF DESCRIPTION OF THE DRAWINGS

FIG. 11 is a perspective view of a player environment in the present invention.

DETAILED DESCRIPTION OF THE PREFERRED EMBODIMENTS

Figure 1:
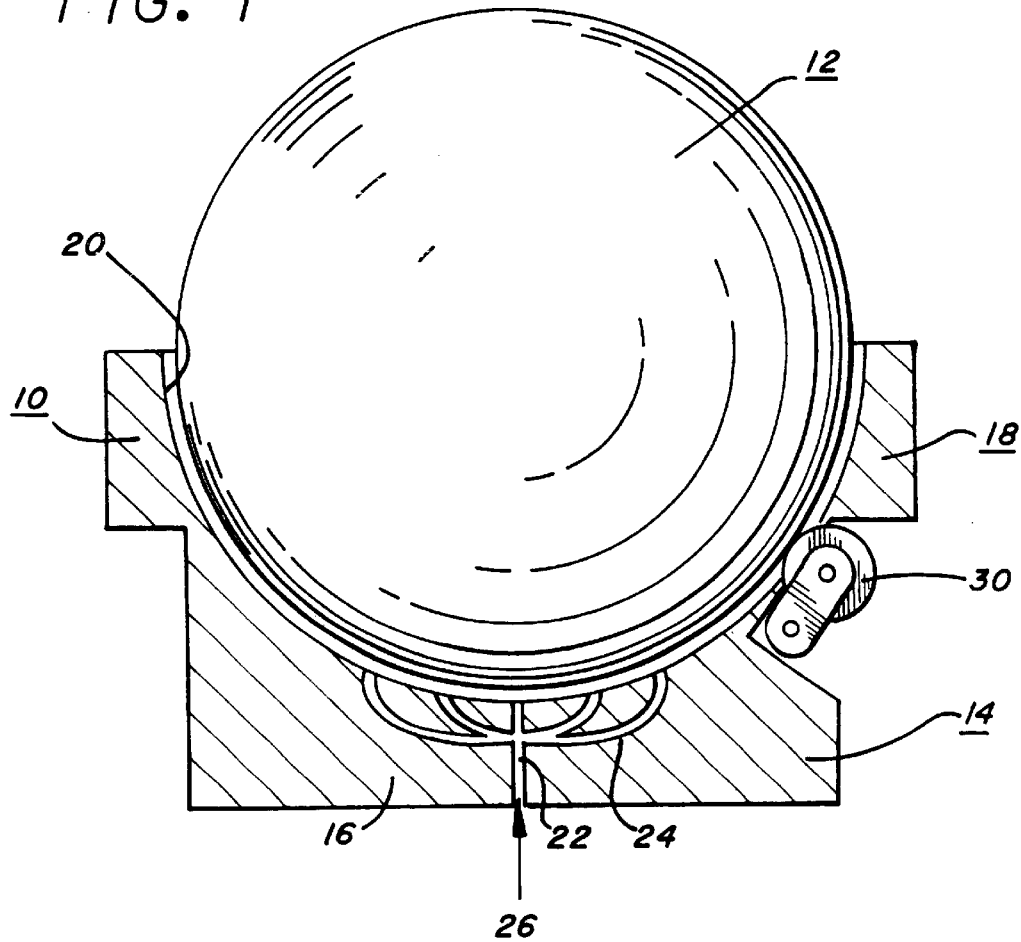
FIG. 1 is an elevational partly sectional view of an input ball and an air bearing in accordance with the present invention.
Figure 2:
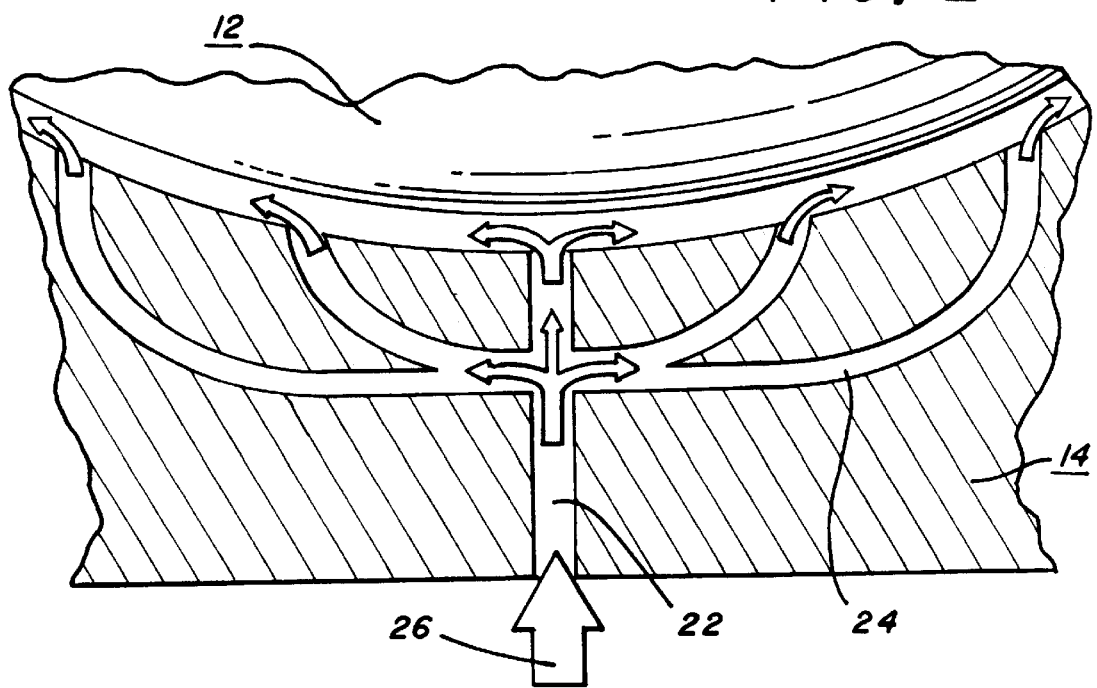
FIG. 2 is a fragmentary enlarged view of a portion of the input ball and air bearing in the practice of the invention.

The present invention is directed to an improved system and method for simulating a ball movement game, adapted to enable movement of a simulated ball responsive to movement of an input ball imparted by a player. The improved system and method provides a realistic simulated game environment, wherein the player may vary the game dynamics and environment. The preferred embodiments of the improved system and method are illustrated and described herein by way of example only and not by way of limitation.

Referring now to the drawings, wherein like reference numerals indicate like or corresponding parts throughout the drawing figures, and particularly to FIGS. 1–6, a system 10 is adapted to provide a simulation of a ball movement game, wherein the simulation includes movement of a simulated ball responsive to movement of an input ball 12 imparted by a player.

As illustrated in FIGS. 1, 2, 4, and 8–10, the input ball 12 is adapted to enable movement to be imparted thereto by a player. The system 10 further includes an element 14 for supporting the input ball 12 so as to enable a player to impart movement to the input ball 12. The supporting element 14 comprises an air bearing 16, which includes a support member 18 including a surface 20 generally complementary to the shape of the input ball 12.

Figure 6:
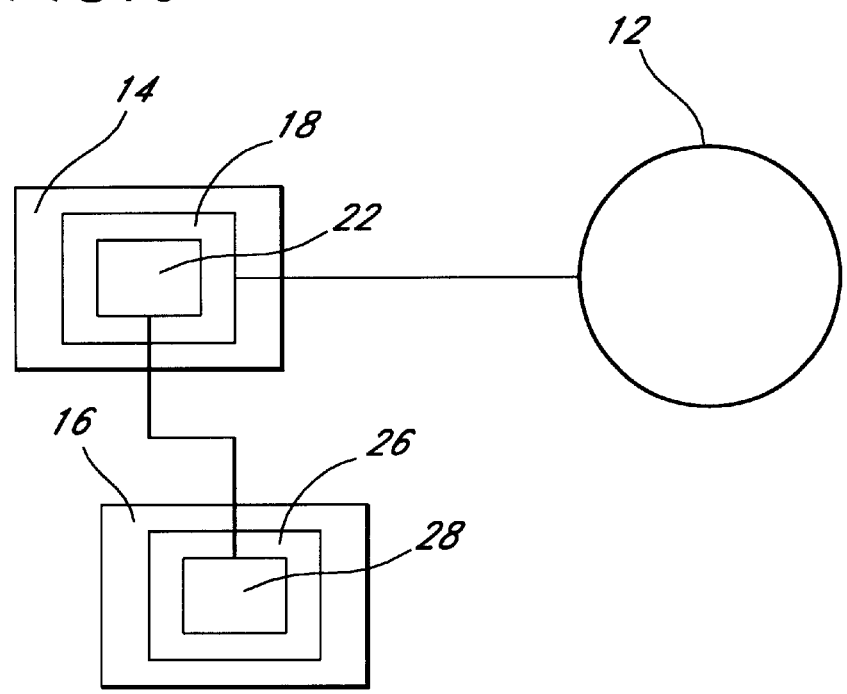
FIG. 6 is a block diagram of an input ball and an air bearing pursuant to the invention.

The support member 18 comprises a casing for the input ball 12. The air bearing 16 further includes a channel 22 which extends through the support member 18 and communicates with the complementary surface 20. The channel 22 further includes a plurality of sub-channels 24 which extend in the support member 18 and communicate with the complementary surface 20. As shown in FIG. 6, the air bearing 16 also includes an element 26 for suspending the input ball 12 to enable movement thereof, adapted to communicate with the channel 22 in the support member 18. The suspending element 26 comprises an element 28 for injecting a medium such as compressed air under pressure through the channel 22 and into the complementary surface 20, to suspend the input ball 12 above the complementary surface 20. It may further be adapted to regulate the pressure of the pressurized medium. The input ball 12 suspended in the air bearing 16 operates like a track ball. A roller 30 bears against a portion of the input ball 12.

Figure 8:
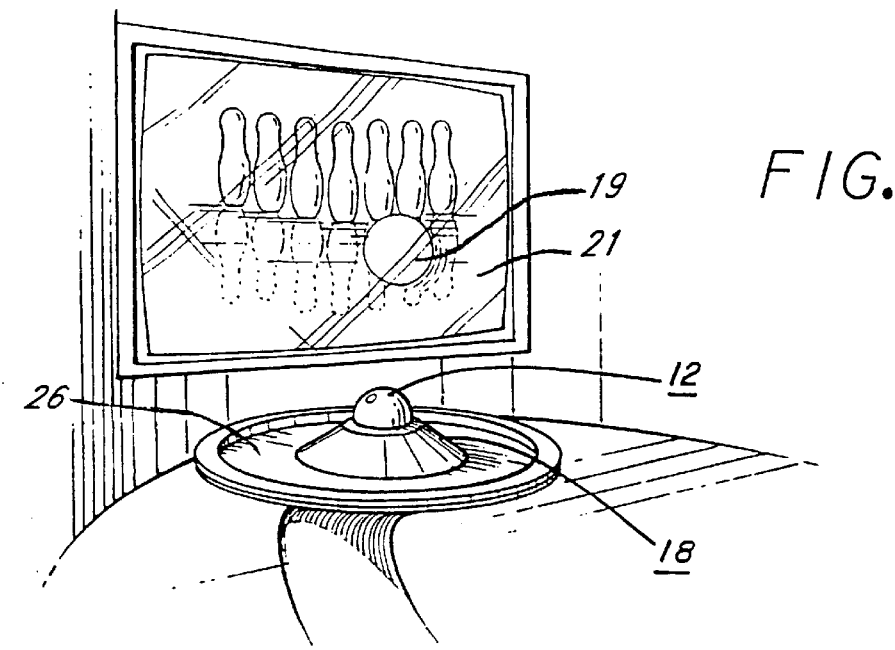
FIG. 8 is a perspective view of an embodiment of an input track ball and a support table in the present invention.
Figure 9:
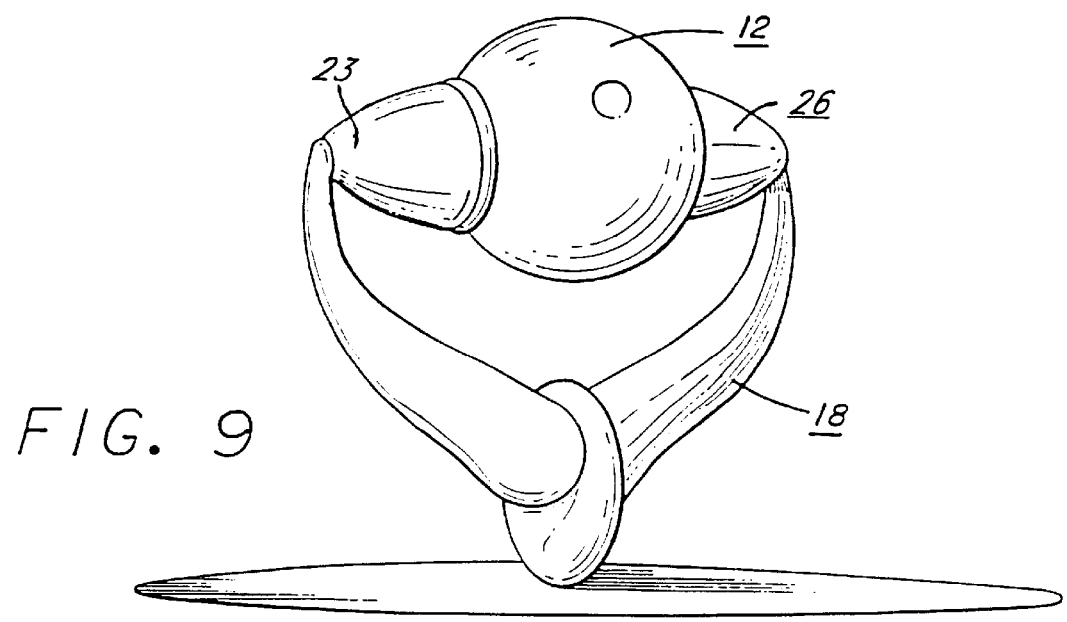
FIG. 9 is a perspective view of another embodiment of an input track ball and a suspending cups support member in accordance with the invention.
Figure 10:
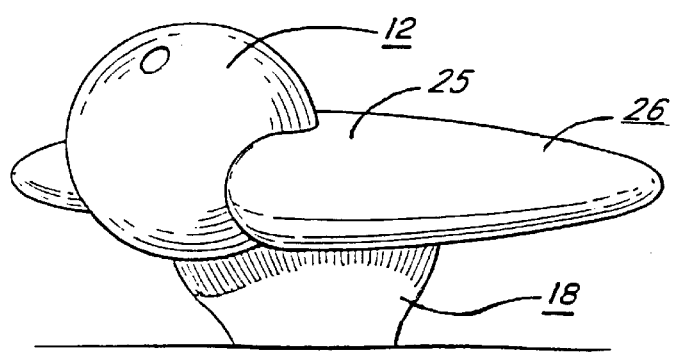
FIG. 10 is a perspective view of a further embodiment of a track ball and an inset rim support table in the invention.

In FIG. 8, an embodiment of an input ball 12 in a support member 18 is shown, which may comprise an input ball 12 on a support table 18 which may be configured as a ball return. A spin of the input ball 12 sends its virtual simulated counterpart 19 rolling down a digital lane 21. In FIG. 9, a further version of the ball suspension element 26 is shown wherein the input ball 12 is suspended on side cups 23 such that spinning of the input ball 12 accurately mimics the throw of a real bowling ball. In another version as shown in FIG. 10, the input ball 12 is inset in the suspension rim 25 on a support table 18, such that the input ball 12 may be spun overhand or underhand.

Figure 3:
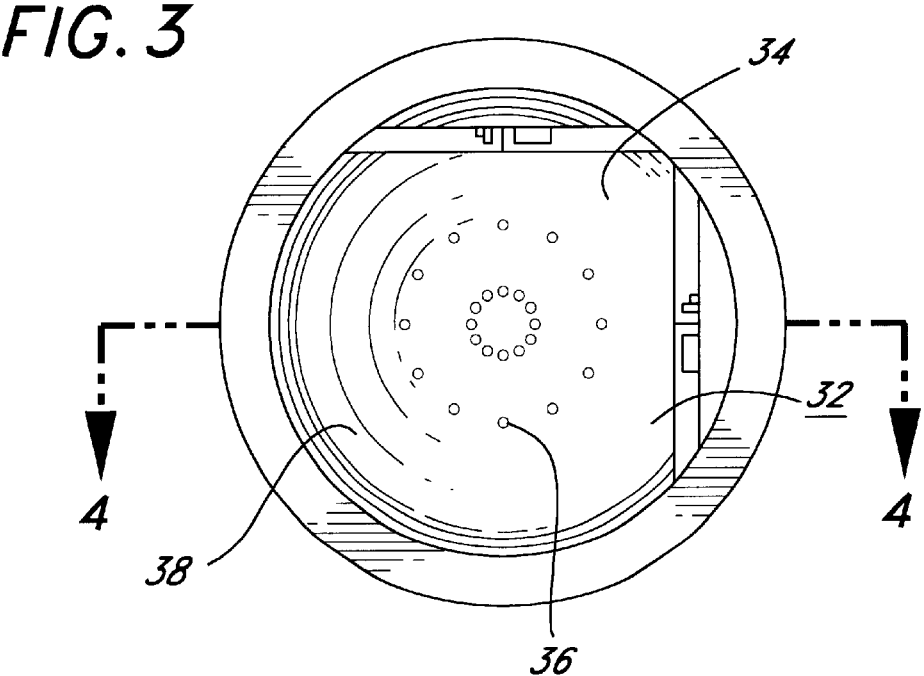
FIG. 3 is a top plan view of an optical encoder in the system of the invention.
Figure 4:
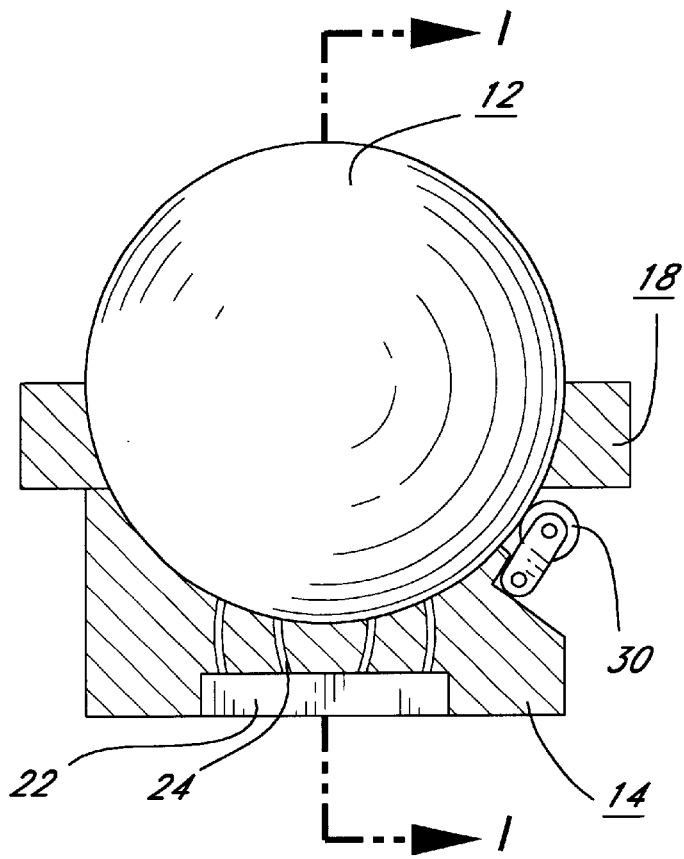
FIG. 4 is a side elevational partly sectional view of the input ball and air bearing pursuant to the present invention.
Figure 5:
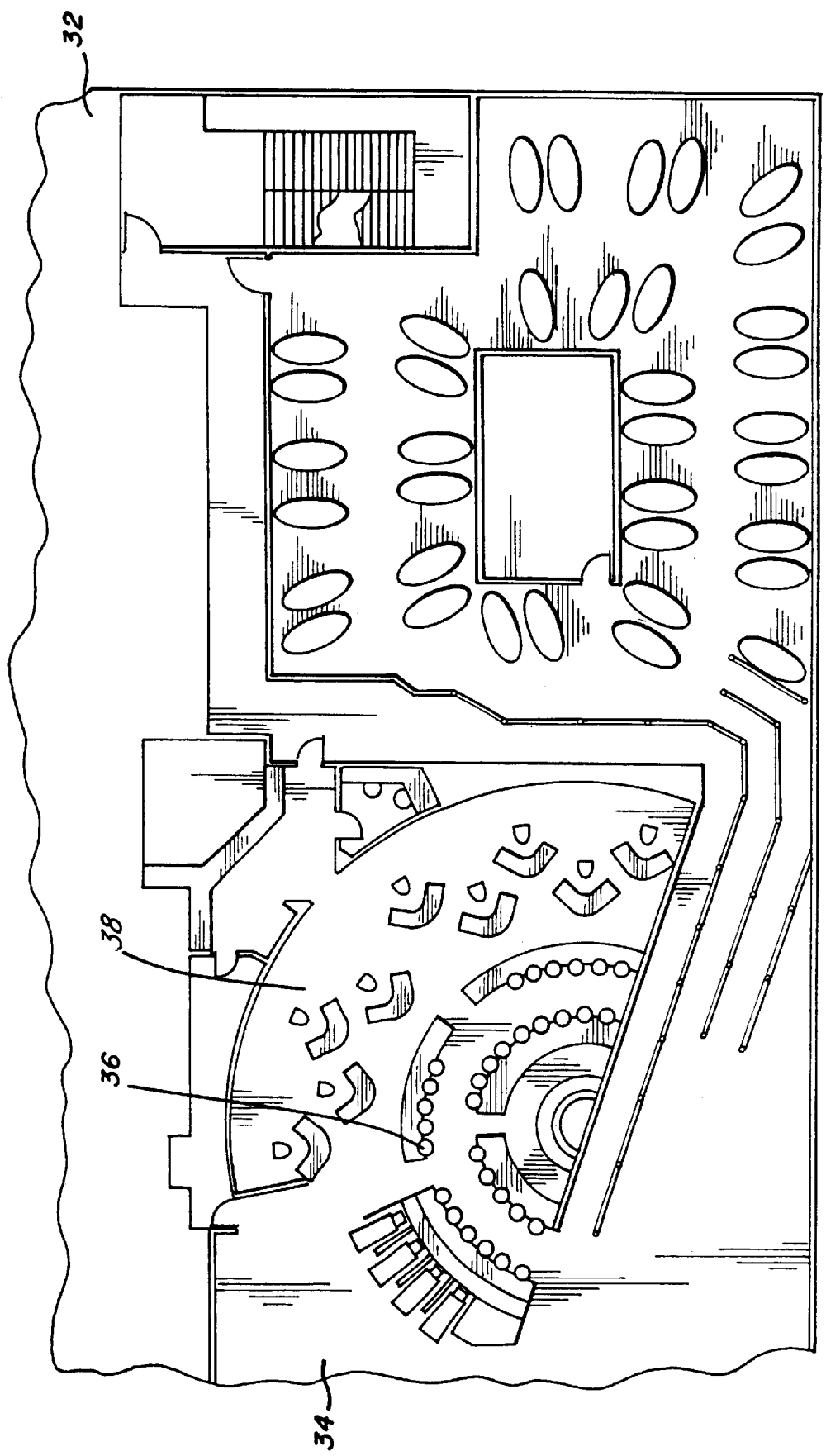
FIG. 5 is a fragmentary elevational partly-broken view of an optical encoder in accordance with the invention.

As shown in FIGS. 3 and 5, the system 10 further includes an element 32 for detecting the parameters of movement of the input ball 12 imparted by the player and generating the parameters of movement of a simulated ball responsive thereto. It is adapted to control the movement of the simulated ball, responsive to movement of the input ball 12 detected upon initial and continued movement of the input ball imparted by the player. It may be adapted to control movement of the simulated ball, upon detection of the spin of the input ball 12 to provide a vector for the simulated ball. It may further be adapted to control the movement of the simulated ball upon detection of the speed and direction of initial movement of the input ball 12, and upon detection of the spin of continued movement of the input ball 12. The detecting element 32 comprises an optical encoder 34, adapted to measure rotary motion of the input ball 12, by detection of the movement of markings 36 on a transparent medium 38, such as a wheel, past a fixed point of light.

The optical encoder 34 includes the wheel 38 which includes the markings 36 thereon, for detecting movement of the input 12 in a dimension. The optical encoder 34 is adapted to generate pulses responsive to movement of the input ball 12, and to read the pulses generated therein. The optical encoder 34 is located proximate the input ball 12, for determining the direction of movement of the input ball 12 in a plane. The parameters of movement of the input ball 12 adapted to be detected by the optical encoder 34 may comprise the spin, the speed and the direction of the input ball imparted by the player. The detecting element 32 may alternately comprise a plurality of optical encoders 34, located at spaced apart positions proximate the input ball 12, for determining the directions of movement of the input ball 12 in a plurality of dimensions. A plurality of optical encoders 34 provide a vector in at least two dimensions, to enable generating the direction of movement of the simulated ball.

Figure 7:
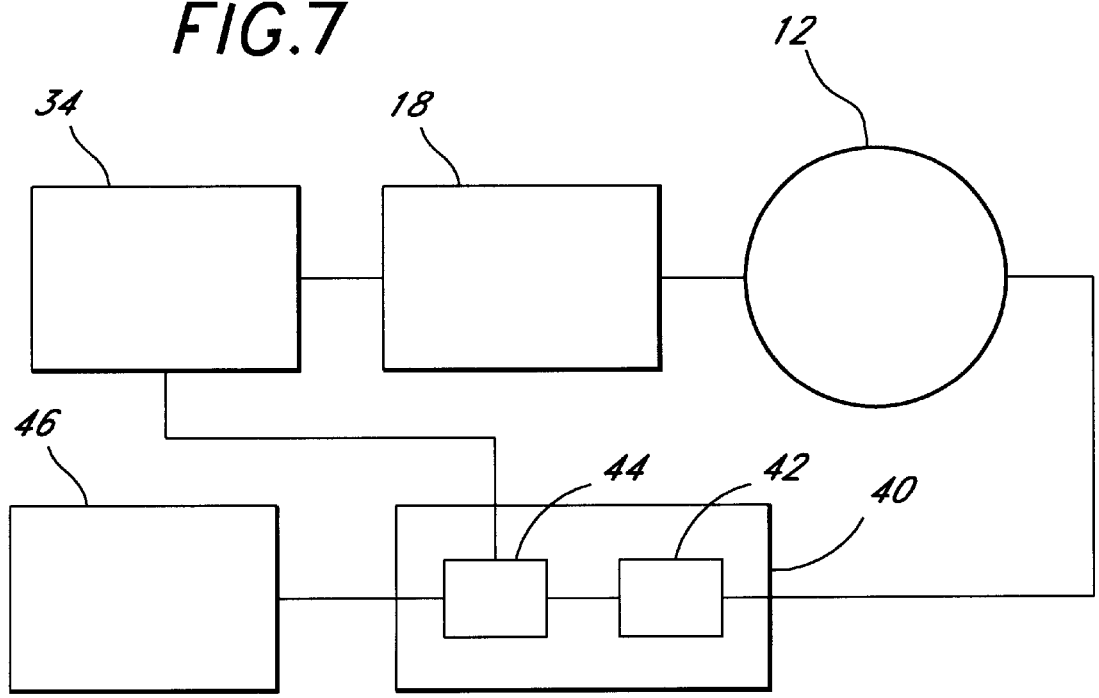
FIG. 7 is a block diagram of an input ball, an air bearing, an optical encoder, a processor, and a program in the system of the invention.

As seen in FIG. 7, the system 10 also includes element 40 for generating a simulation of a ball movement game. The game simulation generating elements 40 are adapted to simulate a ball, and movement of the simulated ball responsive to the parameters of movement generated in the optical encoder 34. They are further adapted to simulate the parameters of the game. The simulation generating elements 40 are also adapted to simulate real movement of a ball in the graphical simulation of a virtual reality environment. They may also be adapted to enable the user to define the parameters of the game. The ball movement game adapted to be simulated in the simulation generating elements may comprise a bowling ball game. The game simulation generating elements 40 include a process 42, and software 44 for programming the processor 42 so as to simulate the ball and movement of the simulated ball. The processor 42 is further adapted to generate a three-dimensional graphical simulation of the ball movement game. The software 44 is further adapted to convert the pulses generated by the optical encoder 34 upon movement of the input ball 12 into the spin velocity and direction parameters of movement of the simulated ball.

Referring to FIG. 7, the system 10 may further comprise a display 46, for displaying the graphical simulation. The display 46 may comprise a screen 48, as shown in FIG. 11, and a video projector 50 for projecting the graphical simulation generated by the processor 42 onto the screen 48.

The environment for the play of a ball game, such as a bowling game, for example, as illustrated in FIG. 11, may comprise rows of seats which may be similar to seating in a bowling alley, including a ball return and a projector which may be located on the ceiling or the floor for example, for projecting the virtual simulated game onto a screen. In alternative embodiments, the bowling game may include a ramp-type lane, wherein the ball is directed down a first ramp, through a jump, and into a second ramp towards the pins. Alternatively, the ramp-type lane may include a hump, a spiral or a bank towards the location of the pins. The game may include an alternative setting, such as a cityscape, where buildings are demolished if the ball leaves the lane, or a lunar landscape, where a low-gravity ball moves more freely about the areas towards the pins.

The game may be played alone, in a group, a team, or a league. The opponents may be in the alley with you, or in another location over a local area network, or in another city or country, such as over the internet.

In accordance with the present invention, the system 10 including the input ball 12, the air bearing 16, the optical encoder 34, the processor 42 and the software 44 is adapted to provide an enhanced user input system for simulating the action of a ball and the game environment thereof. The system 10 is further adapted to enable the user to define the parameters of the game. It is also adapted to provide a realistic virtual reality game environment.

Furthermore, in the present invention, the system 10 including the input ball 12 and the air bearing 16 is adapted to enable free movement of the input ball 10 in the air bearing 16, for generating realistic simulated movement of the simulated ball in the game environment such as a bowling game.

Moreover, pursuant to the invention, the system 10 including the optical encoders 34 is adapted to detect movement of the input ball 12 in a plurality of planes, which enables the system 10 to realistically generate movement of the simulated ball in a plurality of dimensions in the game responsive thereto.

Further in accordance with the invention, the system 10 including the processor 42 and the software 44 is adapted to realistically simulate a virtual reality game environment, and to provide flexibility for enabling the player to change the game parameters or to play other games in a variety of different game environment.

Examples of a preferred form of source code for use in carrying out the software steps in conjunction with the hardware for converting optical encoder pulses into the parameters of movement of the simulated ball, is included in the microfiche appendix attached to this application and incorporated herein.

It will be apparent from the foregoing that, while particular forms of the invention have been illustrated and described, various modifications can be made without departing from the spirit and scope of the invention. Accordingly, it is intended that the invention not be limited, except as by the appended claims.

What is claimed is:

1. A system for simulating a ball movement game, adapted to enable movement of a simulated ball responsive to movement of an input ball imparted by a player, comprising:
    an input ball of size corresponding to a ball used in a ball movement game, adapted to enable movement to be imparted thereto by a player;
    means for supporting the input ball with little friction on an air bearing so as to enable a player to impart initial movement to the input ball therein and to enable free movement of the input ball, said air bearing being complementary in shape to the input ball so as to allow said movement to continue;
    means for detecting and processing speed, direction of movement, and continued spin of the input ball; and
    simulation generating means for generating a three-dimensional graphical simulation of movement of the simulated ball wherein velocity and direction parameters of the simulated ball are first determined in accordance with detected and processed initial speed and direction of movement of the input ball and then in accordance with detected and processed continued spin of the input ball.

2. The system of claim 1, wherein the supporting means include a support member, which includes a surface complementary to the shape of the input ball, and a channel which extends through the support member and communicates with the complementary surface therein, and means for suspending the input ball to enable movement thereof.

3. The system of claim 1, wherein the support member comprises a casing for the input ball.

4. The system of claim 1, wherein the means for detecting movement of the input ball comprise an optical encoder, located proximate the input ball, for determining the direction of movement of the input ball in a plane.

5. The system of claim 4, wherein the optical encoder is adapted to generate pulses responsive to movement of the input ball, and to read the pulses generated therein.

6. The system of claim 5, wherein the the simulation generating means comprises software means for converting the pulses generated by the optical encoder upon movement of the input ball into simulated movement of the simulated ball.

7. The system of claim 1, wherein the means for detecting movement of the input ball comprise a plurality of optical encoders, located at spaced apart positions proximate the input ball, for determining the directions of movement of the input ball in a plurality of planes.

8. The system of claim 7, wherein each of the plurality of optical encoders is adapted to generate pulses responsive to movement of the input ball, and to read the pulses generated therein.

9. The system of claim 1, wherein the simulation generating means include a processor, and software means for generating the three-dimensional graphical simulation of movement of the simulated ball in the processor.

10. The system of claim 9, further comprising means for displaying the graphical simulation.

11. The system of claim 10, wherein the displaying means comprise a screen, and means for projecting the graphical simulation onto the screen.

12. The system of claim 1, wherein the simulation generating means are further adapted to simulate parameters of the game.

13. The system of claim 12, wherein the simulation generating means are further adapted to enable the user to define the game parameters.

14. The system of claim 1, wherein the simulation generating means are further adapted to simulate a ball movement environment.

15. The system of claim 12, wherein the simulation generating means are further adapted to enable the player to define the simulated environment in which the ball movement game is played.

16. The system of claim 1, wherein the simulation generating means are adapted to simulate realistic movement of a ball in a virtual environment.

17. The system of claim 1, wherein the simulation generating means are adapted to control the movement of the simulated ball responsive to the movement of the input ball including the speed and direction of the input ball detected upon initial movement thereof by the player, and the spin of the input ball detected upon continued movement thereof by the player.

18. The system of claim 1, wherein the ball movement game adapted to be simulated in the simulation generating means comprises a bowling ball game.

19. A method of simulating a ball movement game, adapted to enable movement of a simulated ball responsive to movement of an input ball imparted by a player, in a system which includes an input ball adapted to enable movement to be imparted thereto by a player, means for supporting the input ball on an air bearing complementary in shape to the input ball so as to enable a player to impart movement to the input ball therein to allow said input ball to exhibit continued movement and to enable free movement of the input ball, means for detecting movement of the input ball and means for generating a three-dimensional graphical simulation of movement of the simulated ball, the method comprising the steps of:

enabling a player to input movement to the input ball which is of a size corresponding to a ball used in a real version of the simulated game with little rotational friction on the air bearing in the supporting means;

detecting and processing initial speed and direction of movement of the input ball imparted by the player and continuing spin of the input ball, in the movement detecting and processing means; and generating a simulation of a ball movement game wherein velocity and direction parameters of a simulated ball are generated by the simulation generating means first in accordance with detected initial speed and direction of movement of the input ball in accordance with the continued spin of the input ball.

20. The method of claim 19, wherein the means for detecting movement of the input ball comprise an optical encoder, located proximate the input ball, for determining the direction of movement of the input ball in a plane, and wherein the parameters generating step comprises generating the parameters of movement of a simulated ball in the optical encoder.

21. The method of claim 20, wherein the optical encoder is adapted to generate pulses responsive to movement of the input ball, and to read the pulses generated therein, and wherein the parameters generating step comprises generating and reading the pulses comprising the parameters of movement of a simulated ball in the optical encoders.

22. The method of claim 21, wherein the simulation generating means comprises software means for converting the pulses generated by the optical encoder upon movement of the input ball into simulated movement of the simulated ball, and further comprising the step of converting in the software means the pulses generated by the optical encoder.

23. The method of claim 19, wherein the means for detecting movement of the input ball comprise a plurality of optical encoders, located at spaced apart positions proximate the input ball, for determining the directions of movement of the input ball in a plurality of planes, and wherein the movement detecting step comprises detecting movement of the input ball in said plurality of planes.

24. The method of claim 23, wherein each of the plurality of optical encoders is adapted to generate pulses responsive to movement of the input ball, and to read the pulses generated therein, and wherein the parameters generating step comprises generating and reading the pulses comprising the parameters of movement of a simulated ball in the optical encoders.

25. The method of claim 19, wherein the simulation generating means include a processor, and software means for generating the three-dimensional graphical simulation of movement of the simulated ball in the processor, and wherein the simulation generation step comprises generating a simulation of a ball movement game in the processor and the software means.

26. The system of claim 25, further comprising means for displaying the graphical simulation, and wherein the simulation generating step further comprises the step of displaying the graphical simulation.

27. The method of claim 26, wherein the displaying means comprise a screen, and means for projecting the graphical simulation onto the screen, and wherein the simulation generating step further comprises the step of projecting the graphical simulation onto the screen.

28. The method of claim 19, wherein the simulation generating means are further adapted to simulate parameters of the game, and wherein the simulation generating step further comprises generating a simulation of the parameters of the game.

29. The method of claim 28, wherein the simulation generating means are further adapted to enable the user to define the game parameters, and wherein the simulation generating step further comprises enabling the user to define the game parameters.

30. The method of claim 11, wherein the simulation generating means are further adapted to simulate a ball movement enviroment, and wherein the simulation generating step further comprises generating a simulation of a ball movement environment.

31. The method of claim 11, wherein the simulation generating means are adapted to simulate realistic movement of a ball in a virtual environment, and wherein the simulating step further comprises generating a simulation of realistic movement of a ball in a virtual environment.

32. The system of claim 19, wherein the parameters generating means are adapted to control the movement of the simulated ball responsive to the movement of the input ball including the speed and direction of the input ball detected upon initial movement thereof by the player, and the spin of the input ball detected upon continued movement thereof by the player, and wherein the parameters generating step further comprises detecting the speed and direction of the input ball upon initial movement thereof by the player, and detecting the spin of the input ball upon continued movement thereof by the player.

33. The method of claim 19, wherein the ball movement game adapted to be simulated in the simulation generating means comprises a bowling ball game, and wherein the simulation generating step comprises generating a simulation of a bowling ball game.

34. A system for simulating a bowling game, adapted to enable movement of a simulated ball responsive to movement of an input ball imparted by a player, comprising:

a input ball having a size corresponding to a bowling ball, adapted to enable movement to be imparted thereto by a player;

a low friction air bearing complementary in shape to the input ball for supporting the input ball so as to enable a player to impart initial movement to the input ball and so as to enable continuing and free movement of the input ball;

a detector for detecting initial speed and direction of movement of the input ball and continuing spin of the input ball;

a simulation generator for generating a simulation of a ball movement game, adapted to generate a three dimensional graphic simulation of movement of a simulated bowling ball wherein velocity and direction parameters of the simulated ball are responsive to the detected initial speed and direction of movement of the input ball and to the continuing spin of the input ball.

35. A method of simulating a ball movement game, wherein movement of a simulated ball is responsive to movement of an input ball imparted by a player, in a system which comprises an input ball adapted to enable movement to be imparted thereto by a player, a low friction air bearing for supporting the input ball so as to enable a player to impart initial movement to the input ball and to allow continuing spin of the input ball, a detector for detecting the player-imparted initial movement of the input ball and the continuing spin of the input ball, a processor for processing player-imparted initial movement of the input ball and continuing spin of the input ball and a simulation generator for generating a simulation of a ball movement game, adapted to generate a three-dimensional graphic simulation of movement of a simulated ball responsive to the initial and continuing movement of the input ball, wherein the method comprises:

enabling a player to impart initial movement to the input ball in the low friction air bearing of a shape complementary to the input ball;

enabling continuing spin of the input ball through the low friction air bearing mount;

detecting continuing spin, speed and direction of movement of the input ball with the detector;

generating the plurality of parameters of movement of a simulated ball responsive to detecting the initial movement and the continuing spin of the input ball; and generating a simulation of a ball movement game in the simulation generator including simulating three-dimensional movement of the simulated ball, wherein velocity and direction parameters of the simulated ball are responsive to the detected initial speed and direction of movement and continuing spin of the input ball.

* * * * *